Feb. 1, 1944.   S. F. GREIN ET AL   2,340,807
GLASS HANDLING MACHINE
Original Filed Oct. 30, 1937   8 Sheets-Sheet 1
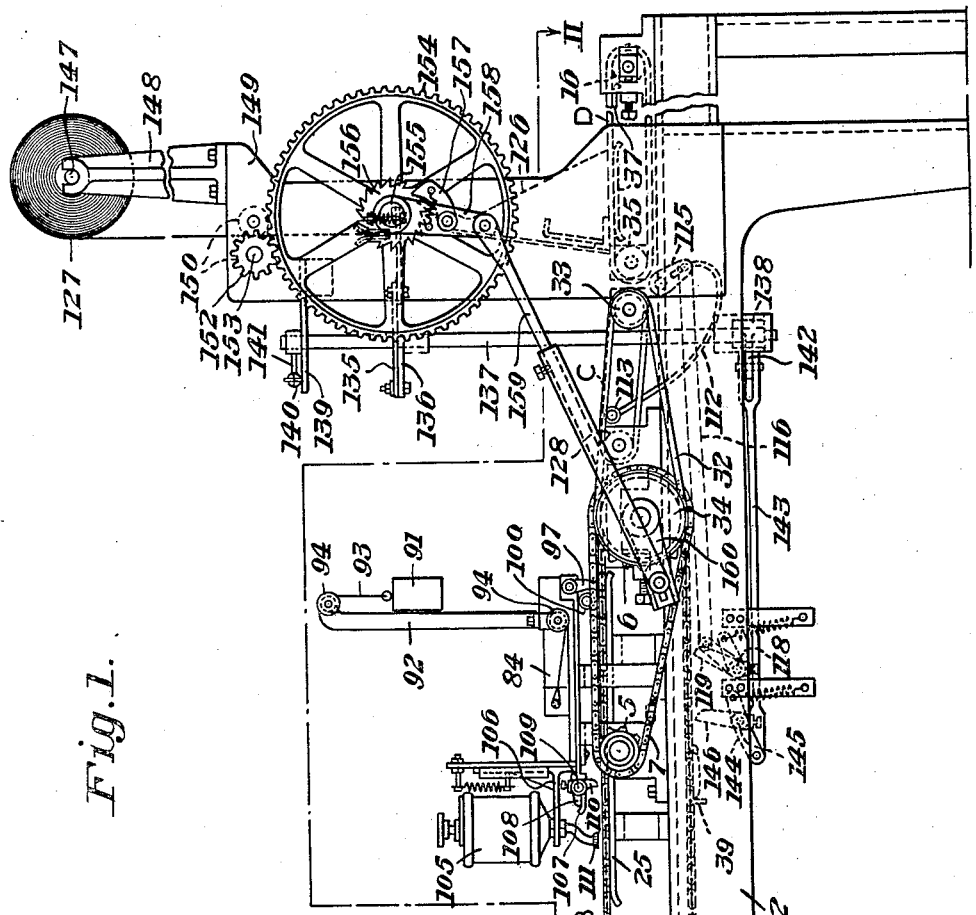
Fig.1.
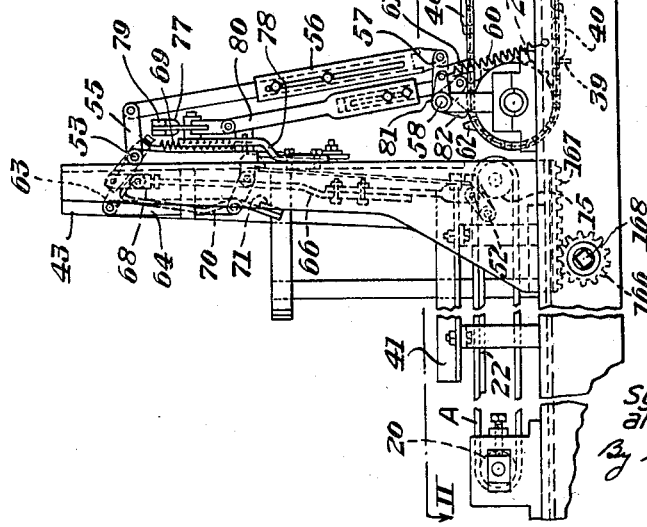
INVENTORS
Sylvester F. Grein
and Pete G. Magrini
By Stebbins and Blenks
Attorneys Feb. 1, 1944.  S. F. GREIN ET AL  2,340,807
GLASS HANDLING MACHINE
Original Filed Oct. 30, 1937  8 Sheets-Sheet 2

INVENTORS
Sylvester F. Grein
and Pete G. Magrini
By Stebbins and Blenko,
Attorneys.

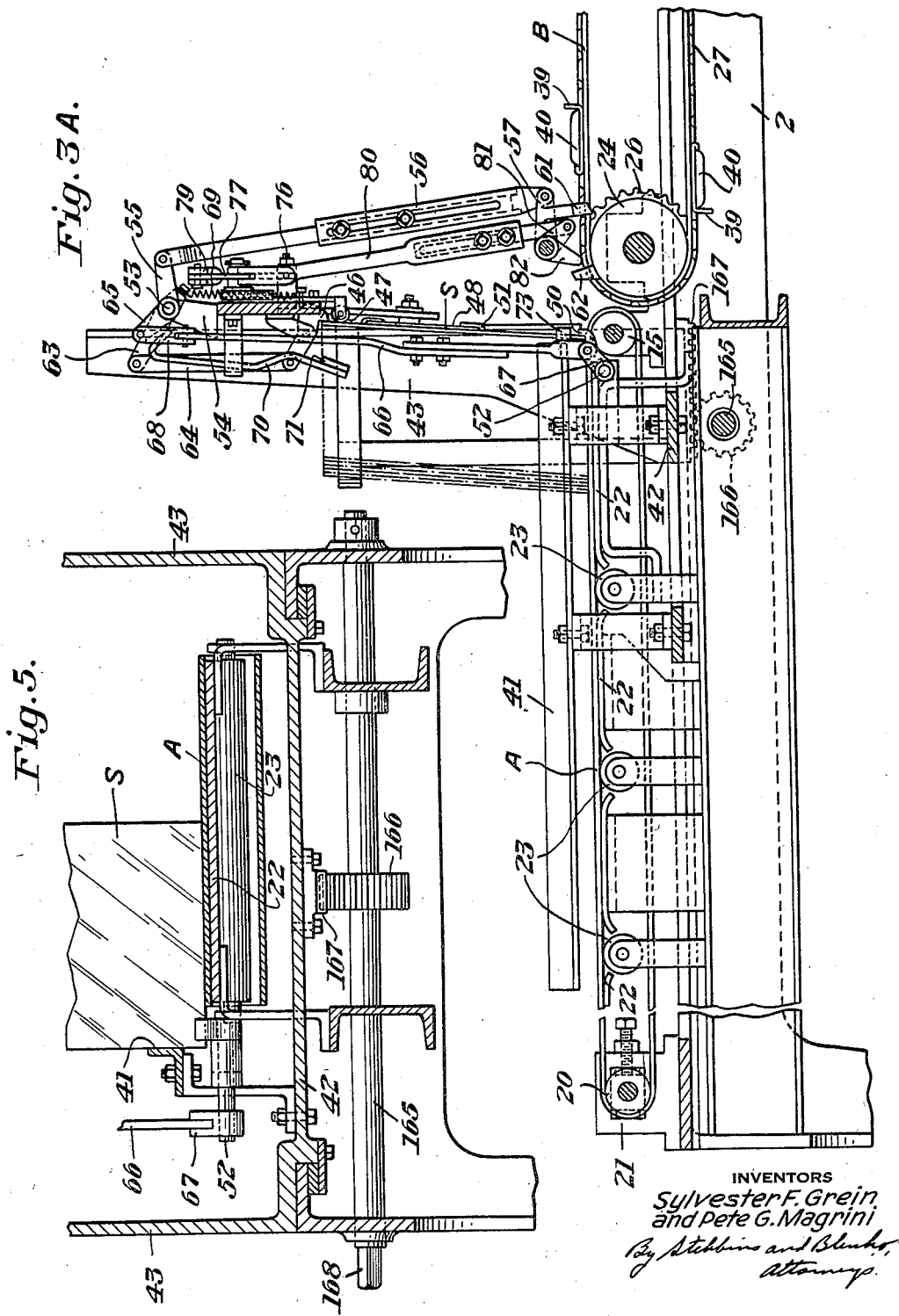

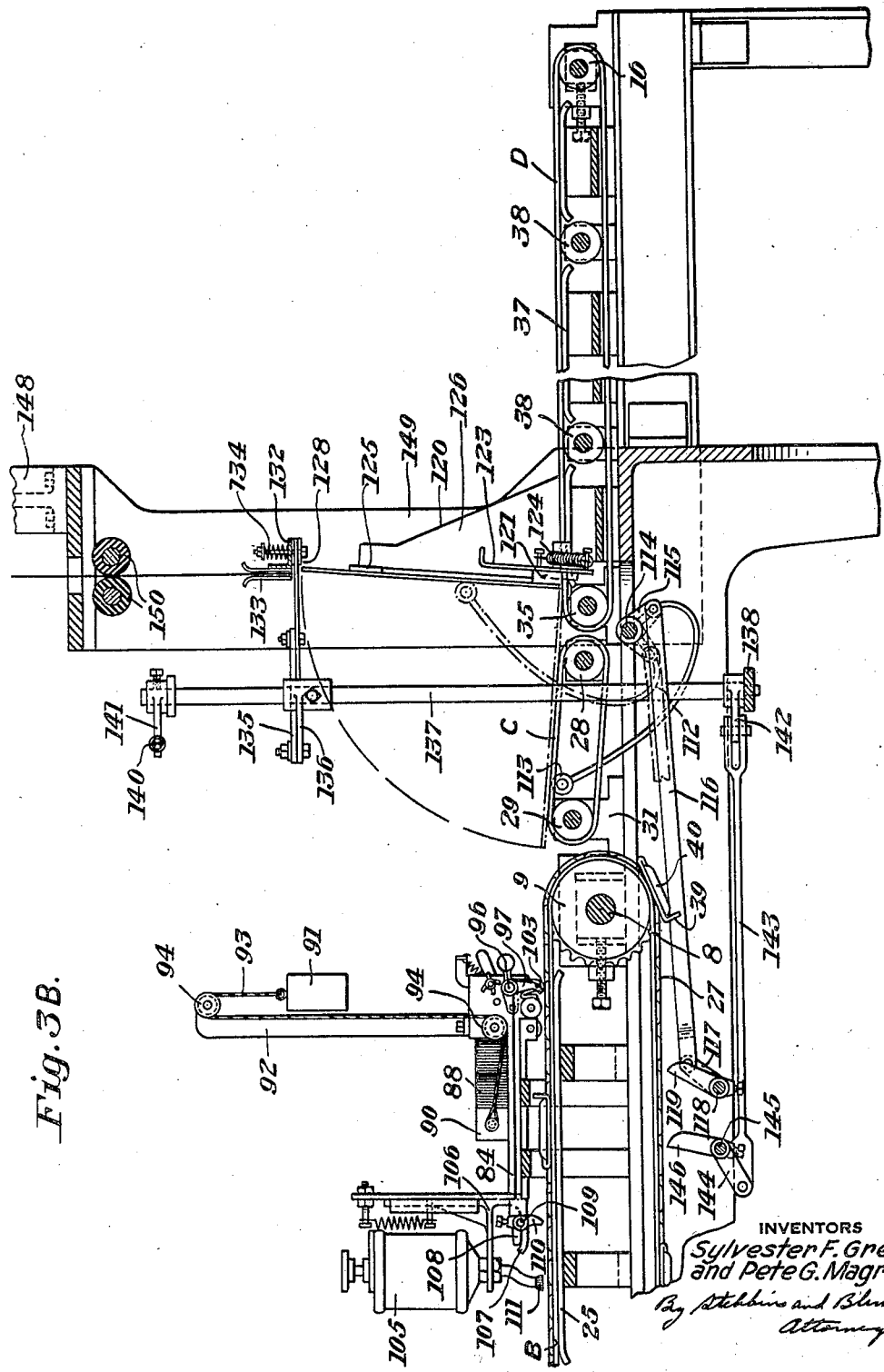

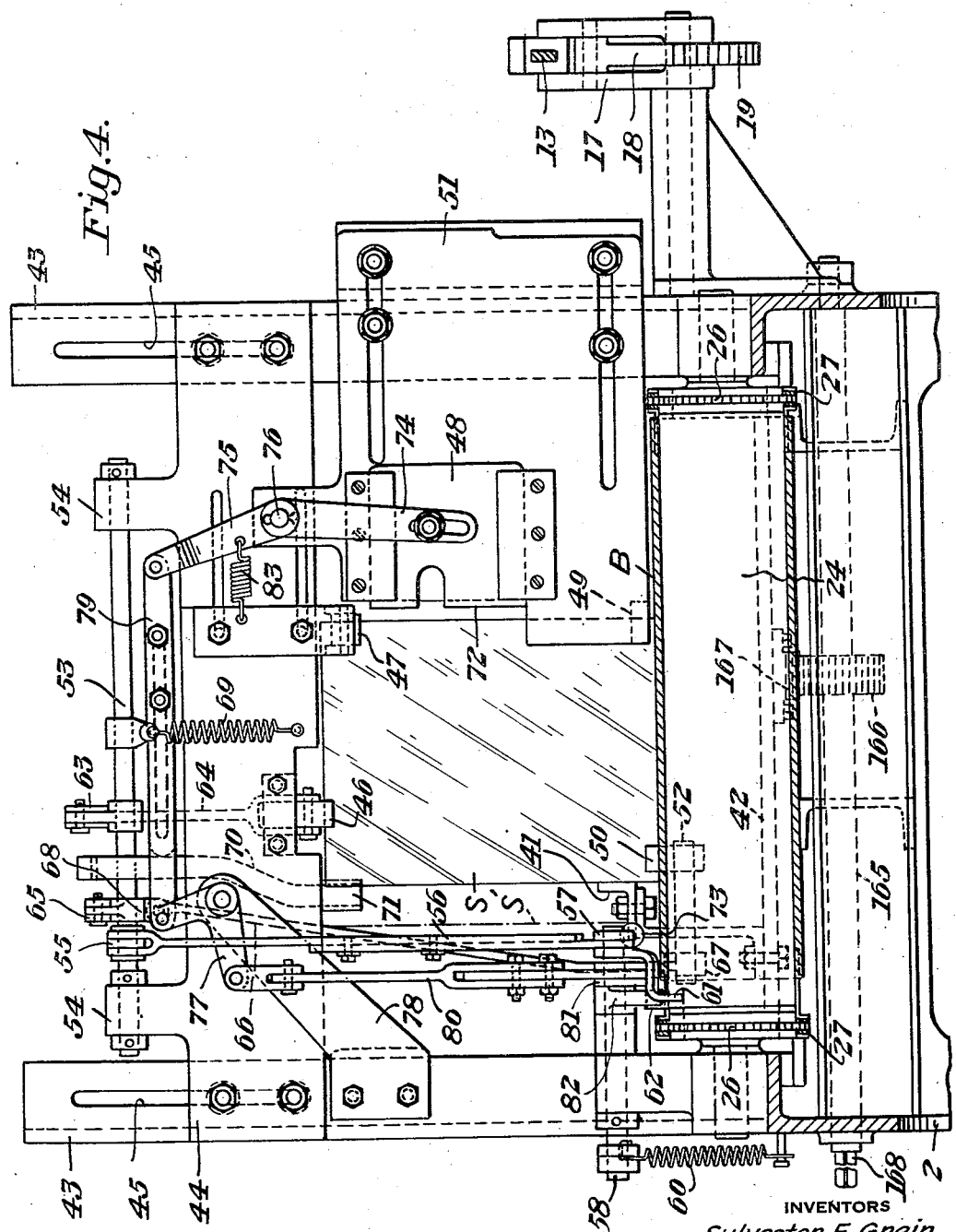

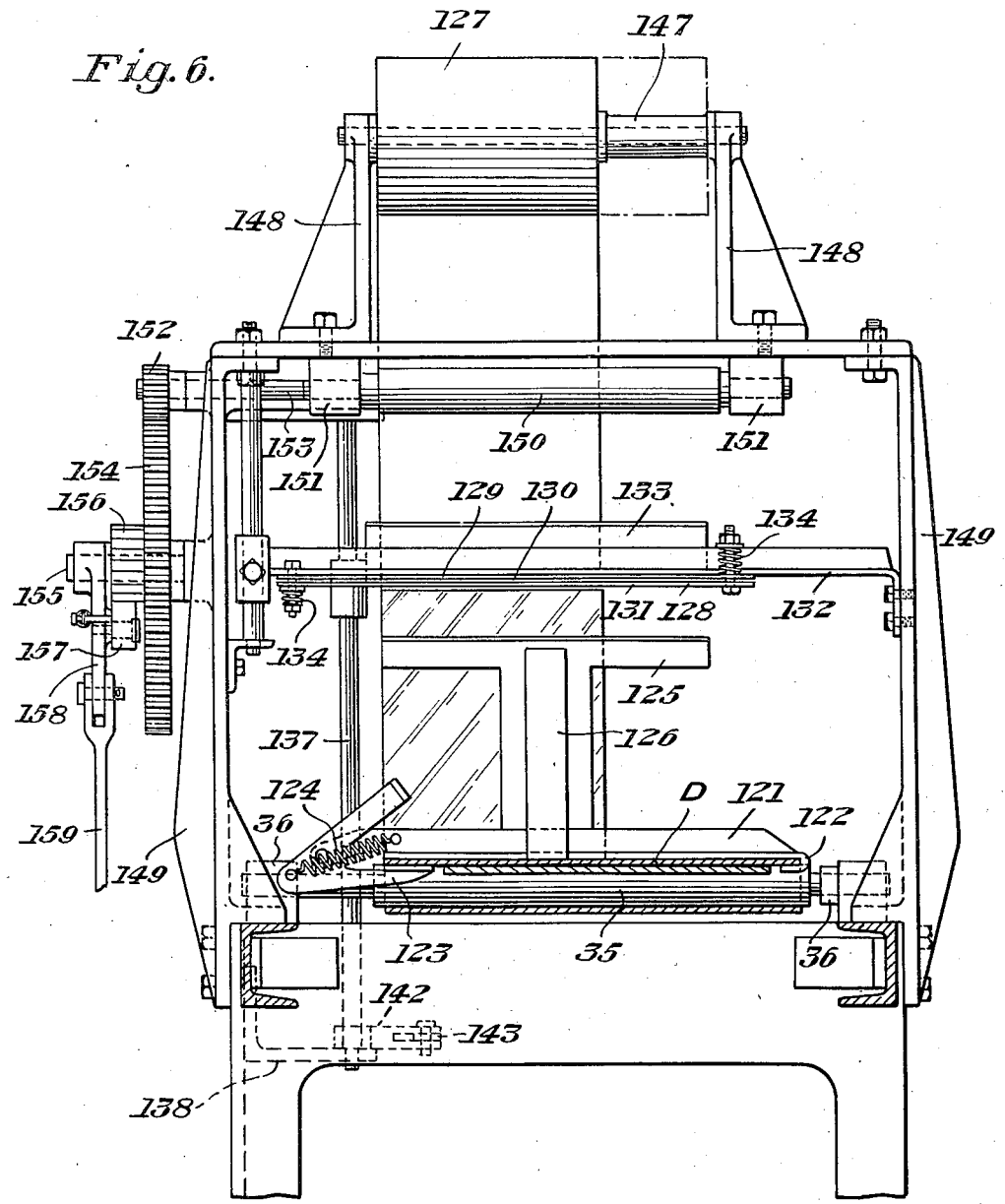

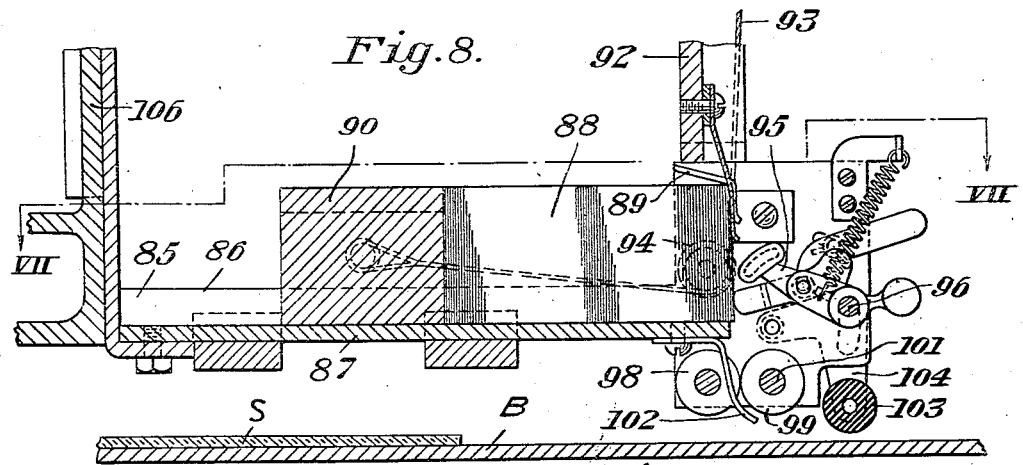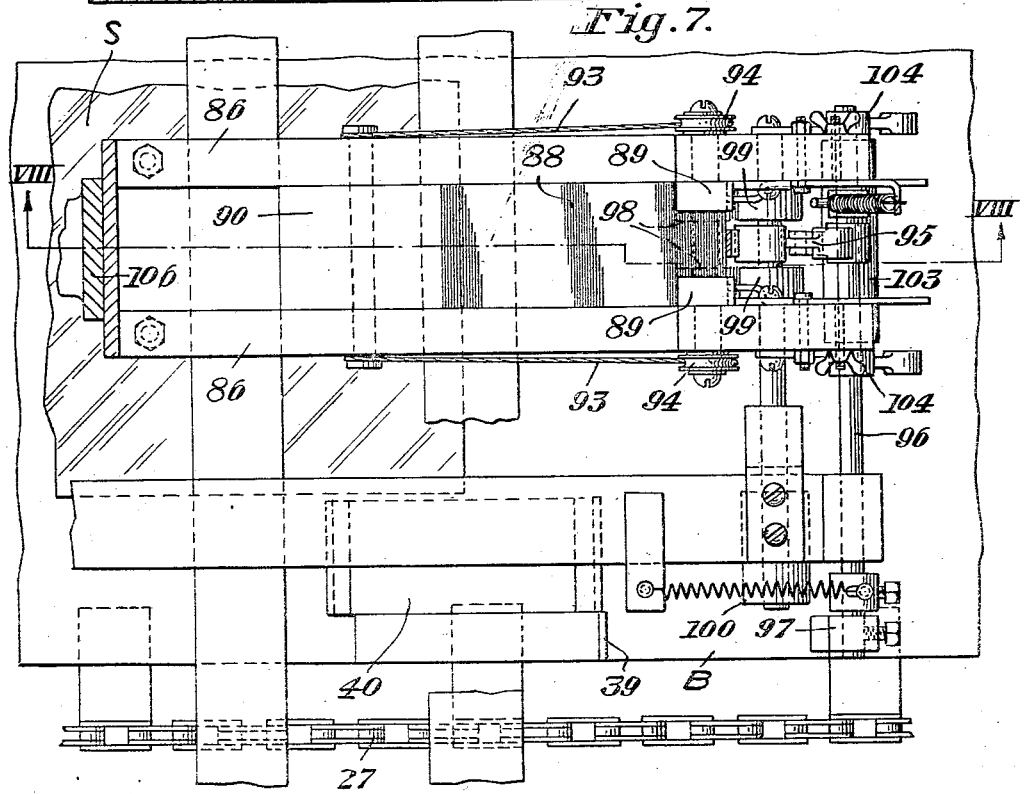

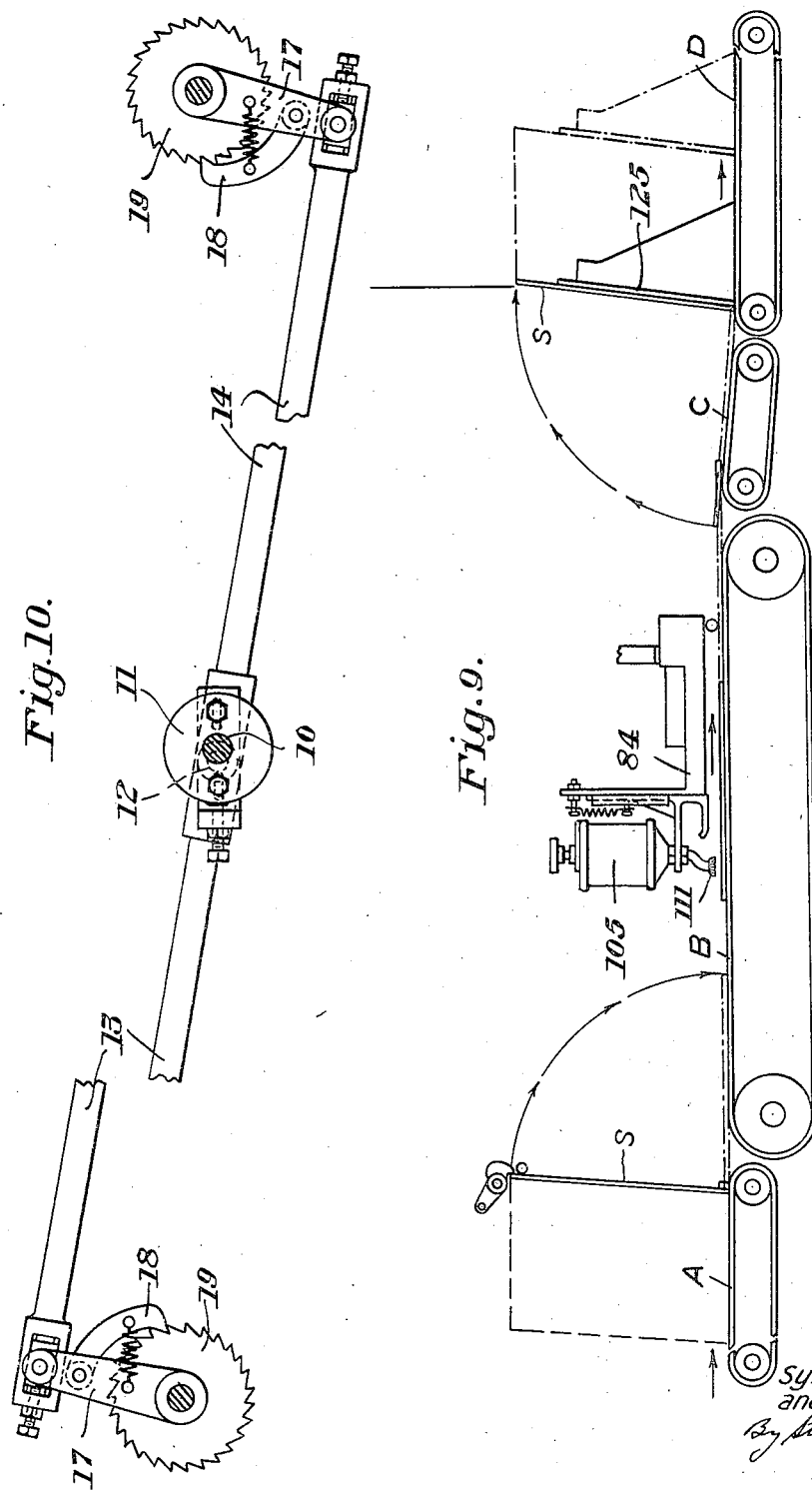

Patented Feb. 1, 1944

2,340,807

UNITED STATES PATENT OFFICE 2,340,807

GLASS HANDLING MACHINE

Sylvester F. Grein and Pete G. Magrini, Belle Vernon, Pa., assignors to American Window Glass Company, Pittsburgh, Pa., a corporation of Pennsylvania Original application October 30, 1937, Serial No. 171,860. Divided and this application January 26, 1942, Serial No. 428,161

6 Claims. (Cl. 214—7)

The present invention relates generally to glass handling machines and more particularly to a method and apparatus for automatically and mechanically handling the glass sheets, for labeling the individual sheets, for restacking them, and for interleaving the restacked sheets with spacing material so that they are in proper condition for immediate packing.

The present application constitutes a division of our co-pending application Serial No. 171,860 filed October 30, 1937, and now Patent No. 2,285,921, dated June 9, 1942.

As set forth in said co-pending application, in accordance with our inventions we provide glass handling apparatus which is of such character as to receive the glass sheets while stacked in a substantially vertical position, unstack the sheets, label them individually or perform some other operation thereon as they are carried past a work station by conveying mechanism, restack the sheets, and at the same time place between the sheets a spacing material such as paper so that the sheets are in appropriate condition for packing. The apparatus which we provide is entirely automatic. The sheets are automatically fed to the conveying mechanism in timed relation with respect thereto. The labeling or other working mechanism is likewise automatically actuated in timed relation with respect to the conveyor. The same is true with respect to the stacking and interleaving mechanism.

The apparatus which we provide represents a substantial improvement over any of the prior art methods and apparatus for handling glass sheets. Our apparatus may be mounted on a single base structure and the operating parts are of such relatively simple character that the cost of production will be quite low. Nevertheless, the apparatus is positive in operation and will not get out of adjustment during normal use thereof. The handling of the glass is entirely mechanical and automatic from the time that the sheets are placed on the apparatus and consequently, the cost of labeling and handling the sheets is lower than where the presently known methods and apparatus are employed, because they involve considerable manual handling of the sheets.

In the accompanying drawings we have shown for purposes of illustration only the presently preferred embodiment of our invention. It will be understood, however, that our invention may be otherwise practiced or embodied within the scope of the claims appended hereto. It will be appreciated that our invention is not limited to the labeling of glass sheets, as it may be employed in connection with the performance of various types of operations thereon. Moreover, it is not limited to the handling of glass sheets as it may be applied to the handling of various other materials when in sheet form.

In the accompanying drawings we have shown our invention as applied to the labeling, stacking and separating of the glass sheets.

In the drawings,

Figure 1 is a side elevation of the machine provided by our invention;

Figure 2:
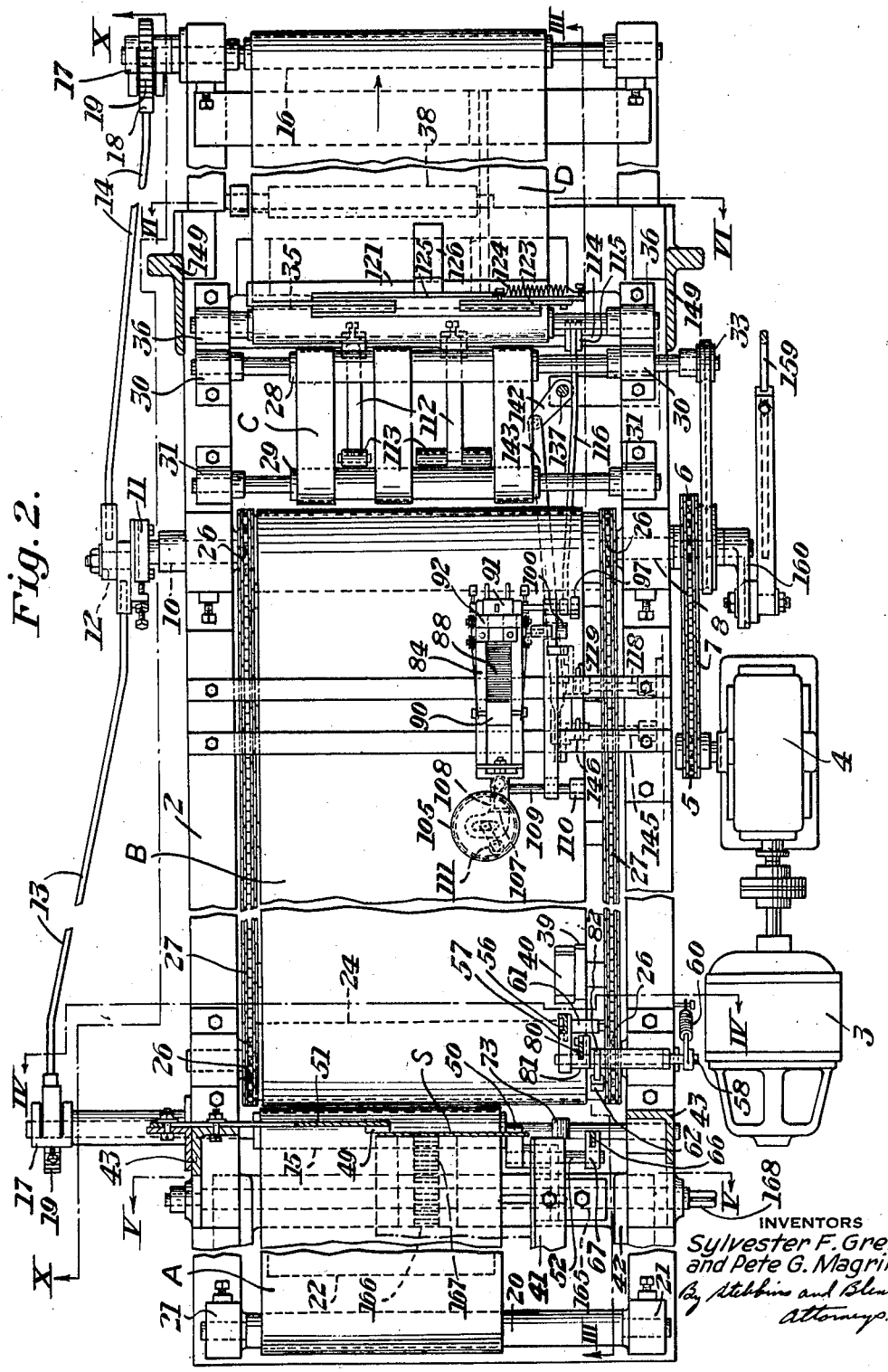
Figure 2 is a sectional plan view taken along the line II—II of Figure 1.

Figures 3a and 3b comprise an enlarged longitudinal sectional view taken along the line III—III of Figure 2, Figure 3a showing the left hand end of the apparatus and Figure 3b showing the right hand end of the apparatus;

Figure 4 is a section taken along the line IV—IV of Figure 2;

Figure 5 is a sectional view taken along the line V—V of Figure 2;

Figure 6 is a sectional view taken along the line VI—VI of Figure 2;

Figure 7 is a view partly in section, partly in plan, of the labeling magazine and the mechanism for feeding and applying labels to the glass sheets, the section portion of this U being taken along the line VII—VII of Figure 3b;

Figure 8 is a sectional view taken along the line VIII—VIII of Figure 7;

Figure 9 is a diagrammatic elevational view showing the conveying mechanism for handling the glass sheets and the labeling mechanism for applying the labels to the glass sheets; and Figure 10 is a sectional view taken along the line X—X of Figure 2.

In the structure shown on the drawings the glass sheets to be labeled are stacked on edge on a continuous belt A. This belt is driven through mechanism to be described and the movement of this belt is synchronized with the movement of the belt B which is adapted to carry the glass sheets in a substantially horizontal position beneath the labeling mechanism. Apparatus is provided for separating the leading glass sheet on the belt A from the remaining glass sheets in the stack and for causing the leading glass sheet to drop onto the belt or conveying mechanism B at the proper time so that operating mechanism carried by the belt B will function to operate the labeling and stacking mechanism at the proper time. Each glass sheet which is fed to the belt B is carried beneath the labeling apparatus and a small amount of water is deposited on the glass sheet at the proper point and a label thereafter placed on the wetted spot and pressed into adhesive engagement with the glass sheet. The glass sheet then continues along the belt B and is discharged therefrom onto a continuous belt C which is rotated at the same speed as the belt B. As the glass sheet passes over this belt and as the leading edge thereof moves beyond the belt C to the continuous belt D, trip mechanism is brought into play for actuating apparatus for raising the glass sheet to a substantially vertical position on the belt D. A stop member or rest for supporting the glass sheets in substantially vertical position is provided on the belt D. Immediately after the glass sheet is transferred from a horizontal position on the belt C to a substantially vertical position on belt D certain apparatus is actuated for feeding the free end of a roll of paper downwardly along the free face of the glass sheet and for cutting off the excess paper. The paper sheets are placed between the glass sheets so as to prevent breakage of the glass sheets in the further handling or shipping thereof. The belt D is moved at a much slower rate of speed than the belts B and C, the belt D moving approximately the thickness of a glass sheet each time that a glass sheet is placed thereon in a vertical position.

It will be apparent that after a sufficient number of glass sheets have been placed on the belt D by the stacking mechanism these sheets may be removed therefrom and boxed for shipment or the glass sheets may be packed while still on the belt D; that is, the glass sheets having been provided with spacing papers and being located on the belt in a vertical position, it is only necessary for the packer to place an appropriate packing box on the stack of glass sheets and then to place the top on the box and the glass sheets are then ready for shipment.

It will be apparent that the machine which we provide will only satisfactorily label a relatively small number of sizes of glass sheets for any given setting thereof. However, the machine which we provide is of such character that it may be readily adjusted to permit the handling and labeling of a substantial number of different sizes of sheets.

In the structure shown in the drawings the four conveyor belts A, B, C and D, are mounted on a main frame or bed 2. These belts are mounted on rollers which are suitably journaled in bearings in the frame and having take-up bearings or boxes for tensioning the belts. The loading belt A and the delivery or stacker belt D are moved intermittently, whereas the labeling belt B and the transfer belt C are driven continuously and at the same rates of speed. A single drive may be provided for the conveyor belt. As shown in the drawings, the driving of the belts is effected by a motor 3 operating through a gear reducer 4, sprocket wheels 5 and 6 and a chain 7. The sprocket wheel 6 is mounted on the shaft 8 of the roller 9 about which the belt B passes. The end of the shaft 8 opposite the end on which the sprocket wheel 6 is mounted is provided with a journal 10. Beyond the journal 10 the shaft is provided with a disk 11 having an adjustable wrist pin 12 which forms an eccentric or crank upon which is journaled a pair of connecting rods 13 and 14. The other end of the connecting rod 13 cooperates with pawl and ratchet mechanism for driving the roll 15 of the loading belt A. The outer end of the connecting rod 14 is similarly connected with a pawl and ratchet mechanism carried on the shaft of the roll 16 of the delivery belt D. These pawl and ratchet structures are identical and comprise a crank arm 17 which is journaled to turn on the roll shaft and which is connected to the connecting rod. The crank arm 17 carries a pawl 18 which engages a ratchet wheel 19 which is fixed to the shaft of the roll. These ratchets are so disposed with respect to their shafts that movement of the eccentric is imparted to one of the rolls while the other remains stationary. This motion reverses for each half revolution of the drive roll 9 of the label belt B so that upon rotation of the roller 9 through 180° the ratchet mechanism for actuating the roller 15 of the loading belt A will be actuated a predetermined distance. During the next one-half revolution of the roller 9 of the labeling belt B, the ratchet mechanism for the roller 16 will be brought into operation and the roller 16 moved a predetermined distance. The ratchet mechanism and other operating parts of the belts A and D are so arranged that each actuation of the rollers 15 and 16 will move the belts A and D, respectively, through a distance amounting to the thickness of the glass sheets being labeled.

As is apparent the loading belt A passes around the roller 15. It also passes around a roller 20 which is journaled in bearings 21. These bearings are preferably of such character as to permit adjustment of the tension of the belt A. The top run of the belt A is supported between the rollers 15 and 20 on tables 22 and rollers 23. The table 22 and the rollers 23 are provided for the purpose of forming a solid base for the belt for supporting the sheets which are to be delivered by the loading belt A to the label belt B.

The label belt B is mounted on the rollers 9 and 24 and is provided with a supporting table 25 immediately beneath the upper run of the belt for the purpose of providing a satisfactory support for the glass sheets as they are carried beneath the labeling mechanism. The rollers 9 and 24 carry sprocket wheels 26. The sprocket wheels on each side of the belt are connected by sprocket chains 27 which are connected to the belt B for the purpose of providing a positive drive for the belt. The sprocket wheels and sprocket chains are desirable in order to preclude any possibility of slippage between the belt B and the rollers 9 and 24. Such slippage would preclude synchronization of the operation of the various belts and the other mechanism to be described hereinafter.

The transfer belt C is composed of a plurality of narrow belts disposed in spaced relation on rollers 28 and 29 which are mounted in bearings 30 and 31, respectively, which are carried by the main frame. The roller 28 is driven continuously from the roller 9 through a belt 32 which cooperates with a pulley 33 on the shaft of the roller 28 and a pulley 34 on the shaft of the roller 9. The transfer belt C is for the purpose of moving the sheet against a stacker frame carried by the delivery belt D. The belt C is preferably made of rubber or is rubber-coated so as to provide sufficient friction between the belt and the glass sheet carried thereby to insure that the glass sheet is brought against the stacker frame before being raised on edge to stacked position.

The delivery belt D passes around the driven roller 16 and around the roller 35 which is mounted in suitable bearings 36 carried by the main frame adjacent the roller 28 of the transfer belt. Tables 37 are provided beneath the upper run of the belt D for the purpose of rendering support thereto for supporting the glass sheets which are carried thereby. Rollers 38 are also provided between the tables for aiding in supporting the belt and for reducing friction.

The belt B adjacent one edge thereof is provided with a plurality of trip members 39 and raised roller engaging portions 40 for actuating the delivery, labeling and stacking mechanisms to be specifically described.

At the loading or feeding end of the machine a plurality of glass sheets are placed on edge on the belt A against an alining rail 41. The leading sheet S of the glass sheets placed on the belt A leans against stop members constituting part of the release mechanism about to be described. The alining rail 41 determines the position of the glass sheet transversely of the belt B and its position with respect to the labeling mechanism. The release mechanism against which the vertically disposed sheets of glass rest comprises a movable frame 42 having two upright standards 43. These standards 43 are connected adjacent their upper ends with a cross-piece 44 which is bolted to the standards through slots 45 therein. This cross-piece 44 is mounted in this way so as to permit vertical adjustment thereof.

The cross-piece 44 carries two stops against which the upper edge of the leading sheet of glass rests. One of the stops 46 is mounted for upward swinging so as to release the sheet and permit it to fall forward onto the label belt B. The other stop member 47 is a rubber roller and is adapted to hold the sheet until the sheet has been slid transversely of the machine from behind the roller by means of a separator plate 48. The leading sheet S is also supported at the bottom edge by means of stops 49 and 50. The stop 49 is fixed to and carried by the guide frame 51 of the separator plate 48. The stop member 50 is carried on a shaft 52 mounted on the frame and is adapted to be swung downwardly upon upward movement of the stop member 46 for releasing the upper edge of the sheet S. Stops 46 and 50 are both actuated through linkage from a common shaft 53 journaled in bearings 54 on the cross-piece 44. The shaft 53 has a crank arm 55 fixed to it. This crank arm is connected by means of a link 56 to a crank arm 57 which is fixed to a shaft 58 supported in a standard 59 from the bearing for the roller 24 of the label belt B. The link 56 is adjustable in length so as to permit the cross-piece 44 to be raised or lowered for the handling of various sizes of sheets. The shaft 58 is normally urged to move clockwise by a spring 60. The crank arm 57 has an off-set portion or arm 61 which normally lies in the path of a trip lug 62 carried by the roller 24. The shaft 53 has fixed to it an arm 63 which is connected by a link 64 to the stop member 46.

Engagement of the lug 62 with the off-set portion 61 of the crank arm 57 causes the latch or stop member 46 to raise so as to permit the leading glass sheet to drop forwardly onto the label belt B. This is effected through the connections described above including the rotation of the shaft 53. This movement of the shaft 53 to raise the lug or stop member 46 also acts to depress the stop member 50. The linkage for accomplishing this comprises a crank arm 65 which is secured to the shaft 53, a link 66 which is connected to the crank arm 65 at its one end and to a crank arm 67 at its other end, the crank arm 67 being secured to the shaft 52. The link 66 is connected to the crank arm 65 by two pivotal connections indicated by the reference character 68. This double pivotal connection permits the link 66 to move over when the guide rail 41 is moved to one side of its normal position to permit edge labeling. The shaft 52 carrying the arm 67 is journaled in a bearing carried by the adjustable guide rail. As pointed out above, the release mechanism is actuated in one direction by the trip 62 carried by the roll 24. It is actuated in the reverse direction by means of a spring 69 which is connected with the shaft 53 and rotates the shaft 53 in the reverse direction to return the sheet holding members 46 and 50 to holding position.

The shaft 53 also has affixed to it an arm 70 having a rubber pad or face member 71 on one end thereof. This arm is preferably of resilient spring metal and its purpose is to push the leading sheet of glass forward toward the label belt B upon actuation of the shaft 53. This causes the glass to fall upon the belt B at the proper time. The glass is stacked on the loading belt at a slight angle to the vertical but if the starter arm is not utilized the leading glass sheet may not fall onto the belt promptly upon the actuation of the release mechanism and if this does not occur the glass sheet will not be properly located on the belt so as to permit proper actuation of the labeling and stacking mechanism with respect to the position of the glass sheet.

In order to permit the delivery of only one sheet of glass to the label belt at a time it is necessary to provide separating mechanism for separating the leading glass sheet from the remaining glass sheets in the stack on the loading belt A. This is accomplished by a separator plate 48 which moves the leading sheet from behind the stop members 47 and 49. This separator plate is mounted for sliding movement in the guide frame 51. The lead edge 72 engages the edge of the leading sheet of the stack of glass sheets on the loading belt A and moves this sheet transversely of the stack of glass sheets a sufficient distance to permit it to fall forwardly past the stops 47 and 49 upon actuation of the stops 46 and 50. Actuation of the plate 48 causes the leading sheet S to move to the position shown in dotted lines in Figure 4 and marked S'. A rubber stop 73 is carried by the rail 41 for limiting the transverse movement of the leading glass sheet.

The separator plate 48 is connected by means of a link 74 to a lever 75 which is pivotally mounted at 76 to the separator guide plate. A bell crank 77 is mounted on a bracket 78 carried by one of the standards 43. One arm of the bell crank 77 is connected with an extensible link 79 which is connected at the other end thereof to the lever 75. The other arm of the bell crank is connected to the upper end of a link 80. The link 80 is likewise extensible so as to permit vertical adjustment of the mechanism. The other end of the extensible link 80 is connected to a bell crank 81 which is loosely mounted on the shaft 58. The bell crank 81 is provided with an off-set trip arm 82 which is adapted to cooperate with the trip lug 62 carried by the roller 24.

A spring 83 normally maintains the separator in retracted position.

In operation, rotation of the roller 24 causes the lug 62 to contact the offset arm 82 of the crank 81 and by reason of the linkage just described to move the separator plate 48 to the left as shown in Figure 4. This moves the leading sheet of glass to the position indicated by the reference character S'. Immediately thereafter, and upon continued rotation of the roller 24, the lug 62 comes in contact with the arm 61 which operates the release mechanism described above so that a glass sheet is deposited on the belt B.

As the glass sheet which has been deposited upon the label belt B is carried forwardly it passes beneath the labeling mechanism indicated generally by the reference character 84. The label magazine is a box-like structure 85 having side walls 86 and a bottom 87. The labels indicated at 88 are placed in the box as shown and abut against stops. At the other end of the pack of labels in the box there is a follower 90 which is normally drawn forward against the pack of labels by a weight 91 which is suspended above the label box on a bracket 92 and which is connected to the follower 90 by a cable 93 which passes about pulleys 94. The weight 91 acts to keep the labels compacted and to pull them forwardly against the stop members 89.

At the forward end of the magazine, separator and feed mechanism is provided for separating and feeding downwardly onto the glass a single label at any one time. This mechanism is intermittently operable as the glass sheets pass beneath the magazine.

The separator comprises a rubber headed wiper arm 95 which is secured to a shaft 96 journaled in the side walls of the magazine. This shaft extends beyond the magazine and at its outer end is provided with a trip finger which lies in the path of movement of the trip members 39 carried by the label belt B. Engagement of the trip member 39 with the finger 97 causes the wiper arm 96 to swing down and, through the contact of its rubber head with the leading label, will carry down a label into the bite of a pair of rolls 98 and 99. The roll 99 is driven through a roller 100 which is secured to the shaft 101. The roller 100 is positioned in the path of the raised pads 40 carried on the edge of the label belt. As the label belt moves forwardly a pad 40 will come in contact with the roller 100 and cause rotation of the roll 99 to feed a label downwardly onto a passing glass sheet. As the label is fed by the rolls it is directed forwardly by a guide member 102. When it is free of the guide member it falls upon a spot on the glass sheet which has previously been wetted by wetting mechanism to be described and as the glass sheet with the label thereon continues forwardly a roller 103 which is suspended from the brackets 104 carried by the label magazine causes the label to be forced into intimate contact with the glass sheet and to adhere thereto.

Before the glass sheet passes beneath the label magazine it passes beneath a water container 105. The water container 105 is mounted on a slide 106 which is provided with a projection 107. This projection 107 is positioned to be engaged by a cam 108 carried by a shaft 109. This shaft carries an arm 110 which is so positioned that it will be engaged by a trip member 39 as it passes thereby.

The trip member actuates the arm 110 and through the mechanism just described the water container which is provided with a wick 111 is moved downwardly so that the wick is brought into contact with the glass and will deposit sufficient moisture on the glass for the wetting of the label when it is subsequently placed thereon.

After the label has been placed on the glass sheet the glass sheet continues in its movement past the labeling mechanism and is deposited on the transfer belt C. As stated above, this transfer belt is formed of a plurality of spaced belts. This spacing is provided so as to permit the movement of the glass sheets from a horizontal position to a vertical position on the stacker or delivery belt D by means of arms positioned below the conveyor. The elevation of the glass sheets from the horizontal position on the transfer belt to a vertical position on the stacker or delivery belt is accomplished by transfer arms 112. The arms 112 are provided with rubber covered contact ends 113 which are adapted to engage the glass sheets. These arms are rocked upwardly through a linkage connection by the trippers 39 carried by the label belt B. The arms 112 are fixed to a shaft 114 which is journaled in suitable bearings. The shaft has a crank arm 115 secured thereto. One end of the crank arm 115 is pivotally connected with a link 116 and the other end of the link 116 is connected by a link 117 to a shaft 118. This shaft 118 is provided with a trip arm 119 which is located in the path of the tripper 39. As the tripper 39 engages the trip member 119 the shaft 118 is rocked and through the linkage just described the shaft 114 is rocked in a clockwise direction as viewed in Figure 3b and the arms 112 raise the glass sheet on the transfer belt C to a vertical position on the delivery or stacking belt D. The operation of the various belts is so synchronized that when the tripper 39 engages the trip member a glass sheet has reached the transfer mechanism and the leading edge thereof has come in contact with the stacker frame carried by the delivery belt.

As stated above the delivery belt D carries a stacker frame 120 which consists of an angle 121 having a horizontal leg portion which is bent at one end into the form of a jaw or hook to hook around the edge of the belt D as indicated at 122. The other end of the angle is provided with a movable clamping jaw 123 which is pivoted to the angle and which is adapted to clamp the opposite edge of the belt D. The clamp 123 is normally held in clamping contact with the belt by means of a spring 124. In this manner the angle is secured to the belt against movement thereof. The angle 121 has secured to it an upright frame which consists of vertical and cross-pieces 125 and a brace member 126 which rests upon the belt D. This stacker frame maintains the glass sheets in a substantially vertical position after they are moved to this position by the transfer arms 112.

As each sheet of glass is elevated to vertical position against the stacker frame 120 a strip of paper is unwound from a roll of paper 127 and is fed down in front of the sheet. The next succeeding sheet is then brought up against the spacing paper.

The paper between the two sheets is cut off close to the top edge of the sheet by a shear indicated generally by the reference character 128. The shear mechanism is actuated through linkage which is adapted to engage the tripper 39 on the lower run of the belt B and this linkage is adapted to be actuated immediately after the actuation of the stacker mechanism. The shear consists of three thin strips of steel 129, 130 and 131 forming the knives of the shear. These strips are carried on a cross rail 132 which is secured to the frame of the machine. The cross rail also carries a paper guide 133. The intermediate strip is the shear knife proper and it is moved between the two outer strips. The three sections forming the shear are clamped together by spring clamps 134 and one of the spring clamps forms the pivotal mounting for the movable knife blade. The other end of the knife blade is connected by a link 135 to a crank arm 136 secured to a shaft 137. The shaft 137 is journaled in bearings 138 and 139. A spring 140 is connected to an arm 141 fixed to the shaft 137 which normally holds the shear blade in inoperative position. The shaft 137 carries a crank arm 142 which is connected by a link 143 to a link 144 fixed to a shaft 145. The shaft 145 has fixed thereto a trip member 146 which is positioned in the path of the tripper 39 carried by the label belt B. As the tripper 39 contacts the trip member 146 through the mechanism just described the shear is actuated and the paper sheared off adjacent the upper edges of the glass sheets.

The feeding of the paper to the glass sheets is accomplished through gearing actuated through connections to the drive roll of the label belt B. The roll of paper is supported on a shaft 147 which is supported on standards 148 mounted on the frame work indicated generally by the reference character 149. The shaft 147 is sufficiently long and the standards 148 spaced sufficiently far apart to permit the use of rolls of paper of varying width so as to permit the use of sheets of paper sufficiently wide to take care of different sizes of glass sheets.

The paper is drawn from the roll 127 by means of feed rolls 150 which are journaled in bearings 151 carried by the frame 149. One of the feed rolls 150 is driven by a pinion 152 which is mounted on the outer end of the shaft 153 of the roll. This pinion 152 meshes with a gear 154 which is carried by a shaft 155 mounted on the frame 149. A ratchet wheel 156 is secured to the shaft 155 and this ratchet wheel is operated by a pawl 157 carried by a crank arm 158 which is loosely mounted on the shaft 155. The other end of the crank arm 158 is connected to an adjustable link 159. The adjustable link or pitman 159 is connected to a crank arm 160 on the shaft of the roller 9. The crank arm 160 is slotted to receive the pivotal connection of the pitman whereby the length of throw of the crank arm 160 may be varied. As will be readily understood, rotation of the shaft of the roller 9 will cause the mechanism just described to feed the paper downwardly during one-half a revolution of said shaft and the pawl 157 will slide over the ratchet 156 during the continued rotation of the shaft of the roller 9.

The apparatus described above is of such character as to permit the handling of sheets of various sizes within certain limits. As shown in the drawings the machine is set for labeling sheets 8″ x 10″, the labels being placed on the glass sheets about two inches in from the right hand edge of the sheet. In some instances, however, it may be desirable to place the label in the corner at the extreme right hand edge of the sheet. In order to accomplish this it would be necessary to shift the guide rail which alines the sheets on the feed table. By moving the guide rail the sheets will be positioned so that the right hand edges thereof will be directly in line with the edge of the label. When the guide rail is moved in this manner it is necessary to move the sheet separator and its guide plate and sheet stops a distance corresponding to the distance the rail has been moved. As pointed out above and as shown in the drawings, these adjustments can readily be effected.

Additional adjustments must be effected in order to permit the labeling of sheets of larger sizes. Assuming that the machine has been set for labeling 8″ x 10″ sheets and it is desired to label 12″ x 14″ sheets, it will be necessary to move or raise the cross rail which carries the release linkage to permit the larger sheets to pass under it. Also this rail and the standards on which it is carried are moved back on the bed or frame of the machine so that upon the releasing of the sheet it will fall upon the conveyor belt in such a position that its lead end will occupy the same relative position on the belt with respect to the trip mechanism as the lead edge of the smaller sheets of glass. In addition to these adjustments it is necessary to effect vertical adjustment of the shear mechanism at the stacker end of the machine. In addition to these adjustments, provision is made for moving the mechanism for feeding the glass sheets to the labeling belt B toward or away from the labeling belt. The entire frame 43 and the parts carried thereby are adjustable. This adjustment is effected by means of a shaft 165 which carries a pinion 166 which cooperates with a rack 167 carried by the base portion of the frame 43. The shaft 165 is suitably mounted in bearings carried by the main frame 2 and one end extends therethrough and is adapted to receive a crank by means of which the shaft may be rotated. The crank end of the shaft is squared as indicated at 168. All of the connecting arms are made adjustable in the manner pointed out heretofore so as to permit the machine to be maintained in synchronism in any adjusted position.

We claim:

1. In apparatus of the character described, the combination of conveying mechanism for conveying relatively flat articles, means for driving the conveying mechanism, a transfer belt cooperating with one end of said conveying mechanism, a stacking belt adjacent one end of said transfer belt, said stacking belt being provided with a support, stacking mechanism for moving articles from said transfer belt to said stacking belt and rotating said articles through an angle of substantially 90°, means for actuating said stacking belt and said stacking mechanism in timed relation with said conveying mechanism, and means actuated by said conveying mechanism for placing a sheet of separating material between adjacent stacked articles.

2. In apparatus of the character described, the combination of conveying mechanism for conveying relatively flat articles, means for driving the conveying mechanism, a transfer belt cooperating with one end of said conveying mechanism, a stacking belt adjacent one end of said transfer belt, said stacking belt being provided with a support, stacking mechanism for moving articles from said transfer belt to said stacking belt and rotating said articles through an angle of substantially 90°, means for actuating said stacking belt and said stacking mechanism in timed relation with said conveying mechanism, and means actuated by said conveying mechanism for placing a sheet of separating material between adjacent stacked articles, said spacing material feeding mechanism including shear mechanism actuated by said conveying mechanism and in synchronism therewith.

3. In apparatus of the character described, conveying mechanism for conveying sheets in horizontal position, means for driving the conveying mechanism, means adjacent the discharge end of the conveyor for supporting said articles on edge, stacking mechanism intermittently actuated in timed relation with the conveyor for moving the articles from flat position to edge position on said supporting means, and means for supplying a spacing material between each of the stacked sheets, said last-mentioned means being intermittently actuated in timed relation with said conveyor and including a pitman, a feeder and connections for intermittently transmitting motion from said pitman to said feeder.

4. In apparatus of the character described, a continuous conveyor for transporting sheets in flat position, means for driving said conveyor, means adjacent the discharge end of the conveyor for supporting said sheets on edge, stacking mechanism intermittently actuated in timed relation with said conveyor for moving sheets from flat position on said conveyor to edge position on the supporting means, said stacking mechanism including a lever actuated by the conveying mechanism, a reciprocable arm and connections between said lever and the reciprocable arm, and means intermittently actuated in timed relation with the conveyor for feeding a spacing material between the stacked sheets.

5. In apparatus of the character described, a continuous conveyor for transporting sheets in flat position, means for driving said conveyor, means adjacent the discharge end of the conveyor for supporting said sheets on edge, stacking mechanism intermittently actuated in timed relation with said conveyor for moving sheets from flat position on said conveyor to edge position on the supporting means, said stacking mechanism including a lever actuated by the conveying mechanism, a reciprocable arm and connections between said lever and the reciprocable arm, and means intermittently actuated in timed relation with the conveyor for feeding a spacing material between the stacked sheets, said spacing material feeding means including a pitman continuously actuated by the conveying mechanism, a shaft intermittently actuated by the pitman and means cooperating with the shaft for feeding the spacing material to a position between the sheets.

6. In apparatus of the character described, a continuous conveyor for transporting sheets in flat position, means for driving the conveyor, supporting means adjacent the discharge end of the conveyor for supporting said sheets on edge, stacking mechanism intermittently actuated in timed relation with the conveying mechanism for moving the sheets from flat position on said conveyor to edge position on said supporting means, spacing material feeding mechanism intermittently actuated by and in timed relation with said conveying mechanism for supplying a spacing material between the stacked sheets, said spacing material feeding mechanism being operatively connected with said conveying mechanism, and a shear intermittently actuated by and in timed relation with said conveying mechanism for shearing the spacing material fed to between said stacked sheets.

SYLVESTER F. GREIN.
PETE G. MAGRINI.